SIGNAL TELEMETERING SYSTEM USING PAIR TRANSMISSION LINES

Filed Dec. 17, 1968 4 Sheets-Sheet 1

INVENTORS
FUMIYUKI INOSE
KAZUO TAKASUGI
BY Craig & Antonelli
ATTORNEYS

Feb. 2, 1971 FUMIYUKI INOSE ET AL 3,560,948

SIGNAL TELEMETERING SYSTEM USING PAIR TRANSMISSION LINES

Filed Dec. 17, 1968 4 Sheets-Sheet 2

INVENTORS

FUMIYUKI INOSE

KAZUO TAKASUGI

BY Craig & Antonelli

ATTORNEYS

INVENTORS
FUMIYUKI INOSE
KAZUO TAKASUGI
BY
Craig & Antonelli
ATTORNEYS

INVENTORS
FUMIYUKI INOSE
KAZUO TAKASUGI
BY
Craig & Antonelli
ATTORNEYS

United States Patent Office 3,560,948

Patented Feb. 2, 1971

3,560,948

SIGNAL TELEMETERING SYSTEM USING PAIR TRANSMISSION LINES

Fumiyuki Inose, Hachioji-shi, and Kazuo Takasugi, Tokyo, Japan, assignors to Hitachi, Ltd., Tokyo, Japan, a corporation of Japan Filed Dec. 17, 1968, Ser. No. 784,363

Claims priority, application Japan, Dec. 22, 1967, 42/81,872; Dec. 27, 1967, 43/83,224; Jan. 10, 1968, 43/1,088, 43/1,089, 43/1,090; Feb. 5, 1968, 43/6,694; Mar. 8, 1968, 43/14,661

Int. Cl. G08c *19/02*

U.S. Cl. 340—186 8 Claims

ABSTRACT OF THE DISCLOSURE

A system for telemetering input data such as temperature which comprises: a detector operatingly converting the input data into electric signal; an amplifier for amplifying and transmitting the electric signal through negative feedback means, and a pair of transmission lines to a measuring instrument; a D.C. power source for supplying D.C. voltage through the transmission lines to a constant current circuit; and an oscillator for generating a rectangular wave to control the detector, amplifier and the feedback means so that a spike voltage involved in the rectangular wave produced by the oscillator is prevented from being transmitted to the instrument through the transmission lines.

This invention relates to a signal telemetering system for the transmission to a central control station of an electrical signal which is proportional to a quantity to be measured such as a temperature or flow at a remote place.

Generally, it is frequently necessary that quantities such as temperatures and flows to be measured be detected at a certain point or place and be indicated or recorded on instruments disposed in a central control station which is more than several kilometers away from the detectors of the temperatures and flows. To deal with such a requirement, the so-called two-wire transmission system has been proposed in which a pair of transmission lines is served not only for supplying a driving voltage and operating voltage from the central control station to a detector and amplifier located at the spot of measurement but also for transmitting a detected signal proportional to a temperature or flow to a measuring instrument disposed in the central control station. However, conventional devices have been defective in that a spike voltage generated during the production of a rectangular waveform voltage for driving the detector and amplifier is amplified and transmitted to the measuring instrument disposed in the central control station. Such a spike voltage tends to give rise to an erroneous operation of the system and is especially objectionable in the case in which a digital unit is employed for the process of the signal in the central control station.

It is therefore a primary object of the present invention to prevent a spike waveform as described above from being transmitted to the central control station thereby to eliminate the adverse effect which is imparted by the spike voltage to the signal circuit system.

Another object of the present invention is to provide a signal telemetering system which is relatively inexpensive and can operate accurately and stably.

Other objects, features and advantages of the present invention will be apparent from the following detailed description when read in conjunction with the accompanying drawings, in which.

Figures 1, 2, 3, 4:
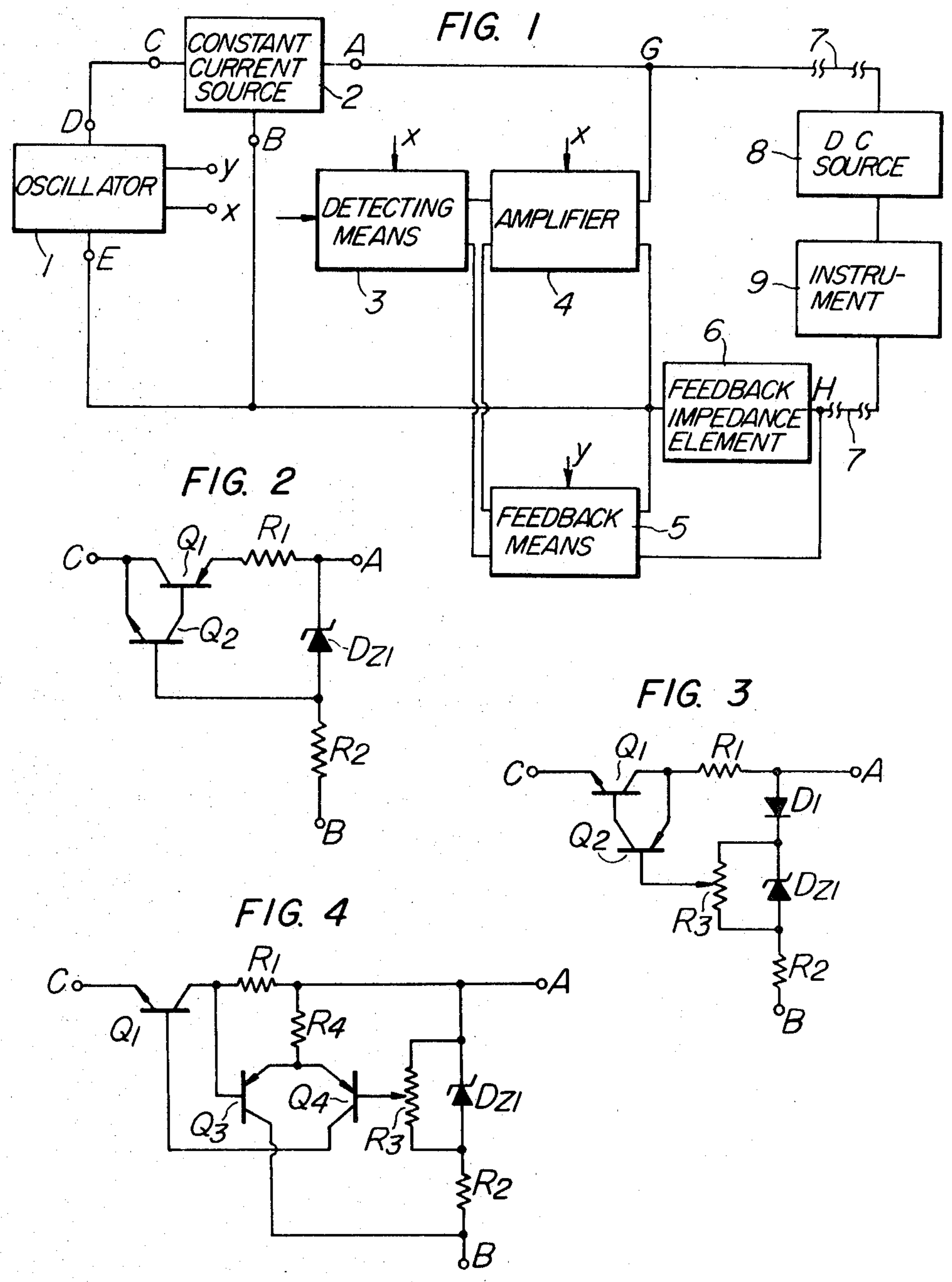
FIG. 1 is a block diagram showing the basic arrangement of the system according to the present invention.
FIGS. 2 through 5 are circuit diagrams showing various forms of a constant current circuit employable in the system according to the present invention.

Referring to FIG. 1 showing the basic arrangement of the present invention, means 1 through 6 are located at a spot of measurement and are connected with means 8 and 9 disposed in a central control station by way of a pair of transmission lines 7. A D.C. voltage is sent out from a D.C. source 8 in the central control station and applied to a constant current circuit 2 disposed at the spot of measurement as an operating voltage therefor. A current of a fixed value is delivered from an output terminal C of the constant current circuit 2 irrespective of any variation in the voltage across terminals A and B. Such constant current is supplied, as an operating power supply, to an oscillator 1 for generating a rectangular waveform voltage. The oscillator 1 delivers rectangular waveforms $x$ and $y$ which are 180° out of phase from each other. The waveform $x$ is supplied to detecting means 3 and an amplifier 4 as a driving voltage therefor, while the waveform $y$ is supplied to feedback means 5 as a driving voltage therefor respectively. The detecting means 3 converts an input quantity to be measured such as a flow, temperature or pressure into a proportional electrical signal. The signal detected by the detecting means 3 is amplified by the amplifier 4 and then transmitted to the central control station by way of the transmission lines 7 by a measuring instrument disposed in the central control station. A feedback impedance element 6 is interposed in the transmission line 7, so a drop voltage across the impedance element 6 is converted into an A.C. voltage by the feedback means 5 and negatively fed back to the input side of the amplifier 4. The rectangular waveform voltage $x$ applied to the detecting means 3 is used as a driving voltage for the detecting means 3 which may, for example, be a strain gauge bridge circuit. Similarly, the rectangular waveform voltage $y$ is used as a driving voltage for a D.C.-A.C. converter in the feedback means 5. The rectangular waveform voltage $x$ applied to the amplifier 4 is used as a synchronizing voltage for a synchronous rectifier in the amplifier 4.

In the signal telemetering system thus constructed as such, both the electric signals representing a measured quantity and the D.C. operating voltage are transmitted through the same pair transmission lines 7. According to the prior art arrangement, once a spike waveform is involved in the rectangular waveform voltage generated by the oscillator 1 it is inevitably transmitted to the instrument 9 disposed in the centrol control station thereby giving rise to an undesirable bad effect. However, such an undesired effect hardly occurs in the system according to the present invention. More precisely, even if a spike voltage be generated by the oscillator 1, it is applied to the instrument 9 by being divided at the ratio of the sum of the internal impedances of the constant current circuit 2 and of the D.C. source 8 and the impedance of the feedback impedance element 6 to the impedance of the instrument 9. Since the internal impedance of the constant current circuit 2 is very large, nearly the whole of the spike waveform voltage is applied to and taken up by the constant current circuit 2.

Respective constituent circuits forming the system according to the present invention will be described in detail below.

CONSTANT CURRENT CIRCUIT

FIGS. 2 through 5 illustrate various practical circuit arrangements of the constant current circuit generally designated by the reference numeral 2 in FIG. 1.

A circuit shown in FIG. 2 comprises a Darlington connection of transistors $Q_1$ and $Q_2$ and a Zener diode $D_{z1}$ connected between the emitter of the transistor $Q_1$ and the base of the transistor $Q_2$. In this circuit, the terminal voltage across the Zener diode $D_{z1}$ is constant irrespective of any variation in the voltage applied between terminals A and B. Thus, the base potential of the transistor $Q_2$ is fixed and a current at a fixed value can be derived from a terminal C.

A circuit shown in FIG. 3 is an improvement of the circuit shown in FIG. 2. More precisely, according to the arrangement shown in FIG. 3, the terminal voltage across the Zener diode $D_{z1}$ is divided by a variable resistor $R_3$ so that such a voltage is applied between the emitter and base of the transistor $Q_2$. Furthermore, a diode $D_1$ is interposed between a resistor $R_1$ and the Zener diode $D_{z1}$. The arrangement shown in FIG. 3 is more advantageous than the arrangement shown in FIG. 2 in that output current from the transistors $Q_1$ and $Q_2$ can freely be varied by adjusting the resistor $R_3$ in the former whereas output current from the transistors $Q_1$ and $Q_2$ is fixed by the Zener voltage of the Zener diode $D_{z1}$ in the latter. In other words, in the case of the circuit shown in FIG. 3, the value of fixed output current can be varied by adjusting the resistance of the resistor $R_3$ despite any fluctuation in the Zener voltage of the Zener diode $D_{z1}$. Moreover, the diode $D_1$ serves as a compensating means which compensates for a thermal variation in the voltages across the base-emitter junctions of the transistors $Q_1$ and $Q_2$.

FIG. 4 shows another form of the constant current circuit employed in the persent inventon. In this circuit, a voltage obtained by dividing the Zener voltage across a Zener diode $D_{z1}$ by a resistor $R_3$ is applied to the base of a transistor $Q_4$ and a drop voltage across a resistor $R_1$ is appled to the base of a transistor $Q_3$. The transistors $Q_3$ and $Q_4$ constitute a differential amplifier. Thus, a current proportional to the difference between the inputs applied to the bases of the transistors $Q_3$ and $Q_4$ flows out of the collector of the transistor $Q_4$. A transistor $Q_1$ acts to vary the current flowing through the resistor $R_1$ so that the difference between the inputs described above becomes zero. Therefore, in the normal state, the drop voltage across the resistor $R_1$ is equal to the divided Zener voltage divided by the resistor $R_3$ so that the current flowing through the resistor $R_1$ (which current is substantially equal to the current flowing out from a terminal C) can thereby be maintained at a fixed value.

The constant current circuit constructed as such is very stable since, even when the output current varies for some reason, the circuit acts to restore the output current value to the fixed value delivered in the normal state of the circuit. Furthermore, transistors $Q_3$ and $Q_4$ of the same kind may be employed under similar conditions so as to effect temperature compensation and to obtain satisfactory operating characteristics in spite of a temperature variation over a wide range.

A variation in the voltage $V_{AB}$ across terminals A and B may result from a variation in the output of the amplifier, that is, signal current $I_0$ delivered from the amplifier 4 in FIG. 1. Thus, the variation in the signal current $I_0$ may positively be utilized to obtain a constant current which is more stable than in the circuit shown in FIG. 4.

Figure 5:
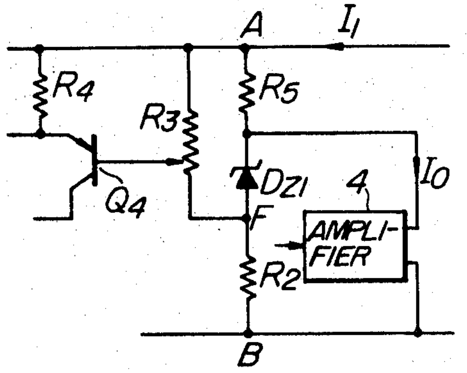

Principal parts of a circuit employing this method are shown in FIG. 5 which is a modification of the circuit shown in FIG. 4. In the circuit having an arrangement as shown, a variation in the output current $I_0$ from the amplifier 4 results in a variation in the terminal voltage at a resistor $R_5$. When a current $I_1$ flowing through the transmission line increases from any reason, for example, as the output current $I_0$ increases, resulting in a reduction in the voltage across terminals A and B. Accordingly, the operating current flowing through the Zener diode $D_{z1}$ slightly decreases and the Zener voltage is thereby decreased although the decrease is slight. However, the terminal voltage at the resistor R increases as a result of the increase in the output current $I_0$, and the voltage across the series circuit of the resistor $R_5$ and the Zener diode $D_{z1}$ is kept at a substantially fixed value. Since the input to the transistor $Q_4$ can thereby be maintained at a substantially fixed value a stable constant current output can be delivered from the transistor $Q_4$.

While several of these forms of constant current circuit especially suitable for use in the system according to the present invention have been illustrated, it will be understood that the constant current circuit is in no way limited to those illustrated herein and other constant current circuits may be employed in lieu thereof.

OSCILLATOR

The oscillator 1 in the system according to the present invention receives the output from the constant current circuit as an operating power supply thereof so as to generate a rectangular waveform voltage.

Figure 6:
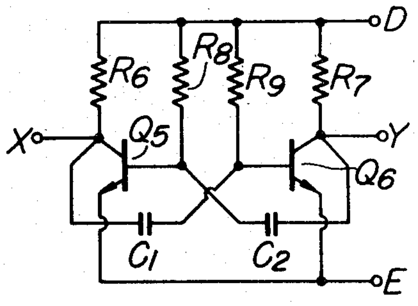
FIGS. 6 through 8 are circuit diagrams showing various forms of a rectangular wave oscillator employable in the system according to the present invention.

One form of the oscillator is shown in FIG. 6 and is commonly known as a CR type multivibrator. The circuit comprises a pair of transistors $Q_5$ and $Q_6$. A positive feedback path connects the collector of the transistor $Q_5$ to the base of the transistor $Q_6$ through a capacitor $C_1$, while a similar positive feedback path connects the collector of the transistor $Q_6$ to the base of the transistor $Q_5$ through a capacitor $C_2$. Because of the above arrangement, the transistors $Q_5$ and $Q_6$ are alternately turned on and off so that rectangular waveform voltages which are opposite in phase to each other can be derived from terminals X and Y.

How these rectangular waveform voltages are used in certain circuits will be described in detail later.

Figure 7:
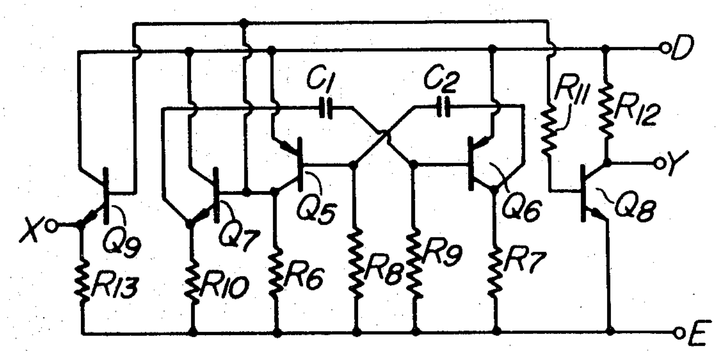

The circuit shown in FIG. 6 is insufficient in its rising characteristic of the voltage waveform. An improved oscillator circuit free from the above defect is shown in FIG. 7. In this circuit, a positive feedback path directly connects the collector of a transistor $Q_6$ to the base of a transistor $Q_5$ through a capacitor $C_2$. On the other hand, the output derived from the collector of the transistor $Q_5$ is applied to the base of a transistor $Q_7$, and a feedback path connects the emitter of the transistor $Q_7$ to the base of the transistor $Q_6$ through a capacitor $C_1$. The signal appearing at the collector of the transistor $Q_5$ is further applied to transistors $Q_8$ and $Q_9$ so that one of the outputs is derived from the collector of the transistor $Q_8$ while the other output is derived from the emitter of the transistor $Q_9$. These outputs are in the form of rectangular waveforms which are opposite in phase to each other.

In this circuit, the time constant in the rising characteristic of the transistor $Q_5$ is determined by the product of the capicitance of the capacitor $C_1$ and the resistance of a resistor $R_{10}$. The resistance of the resistor $R_{10}$ can be determined independently of the values of other circuit elements. It is therefore possible to reduce the time constant $C_1R_{10}$, thereby to improve the rising characteristic of the transistor $Q_5$. Thus, the output derived from the collector of the transistor $Q_5$ has an improved rising characteristic over that of the output delivered from the circuit shown in FIG. 6.

Figure 8:
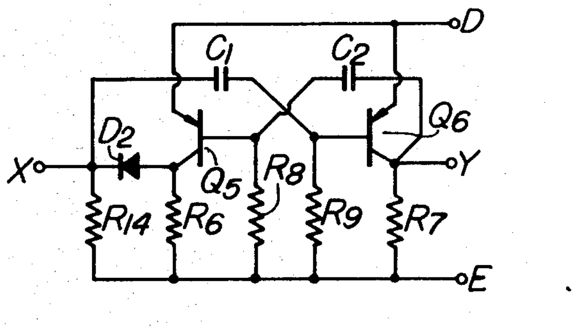

Another form of the oscillator for generating such rectangular waveform voltages is shown in FIG. 8. The circuit shown in FIG. 8 is actually a simplified modification of the circuit shown in FIG. 7. More precisely, in FIG. 8, the transistor $Q_7$ in FIG. 7 is replaced by a diode $D_2$ and a positive feedback path connects the base of the transistor $Q_6$ to the junction point between the diode $D_2$ and a resistor $R_{14}$ through a capacitor $C_1$. The time constant in the rising characteristic of the transistor $Q_5$ in this circuit is also determined by the capacitance of the capacitor $C_1$ and the resistance of the resistor $R_{14}$. The time constant can be reduced since the resistance of the resistor $R_{14}$ can be determined freely.

While any one of the oscillators described above can satisfactorily be employed in the system according to the present invention, any other known oscillator such as a rectangular wave oscillator commonly known as a Royer circuit may be employed in lieu thereof.

DETECTING MEANS, AMPLIFIER AND FEEDBACK MEANS

Figure 9:
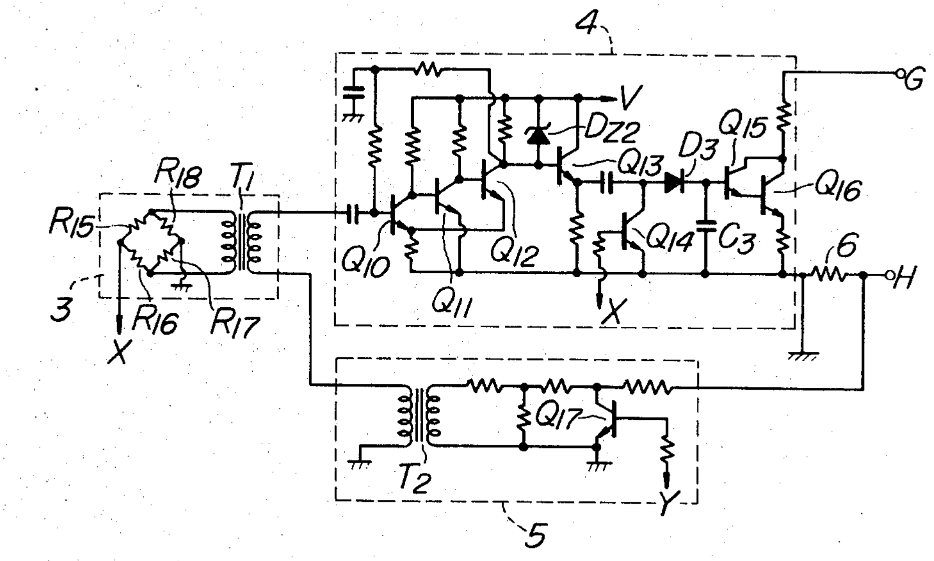
FIGS. 9 through 11 are circuit diagrams showing various forms of detecting means, amplifier and feedback means employable in the system according to the present invention.
Figure 10:
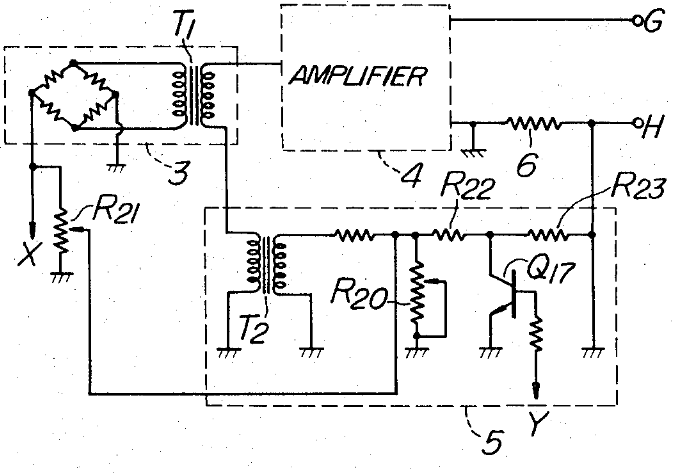
Figure 11:
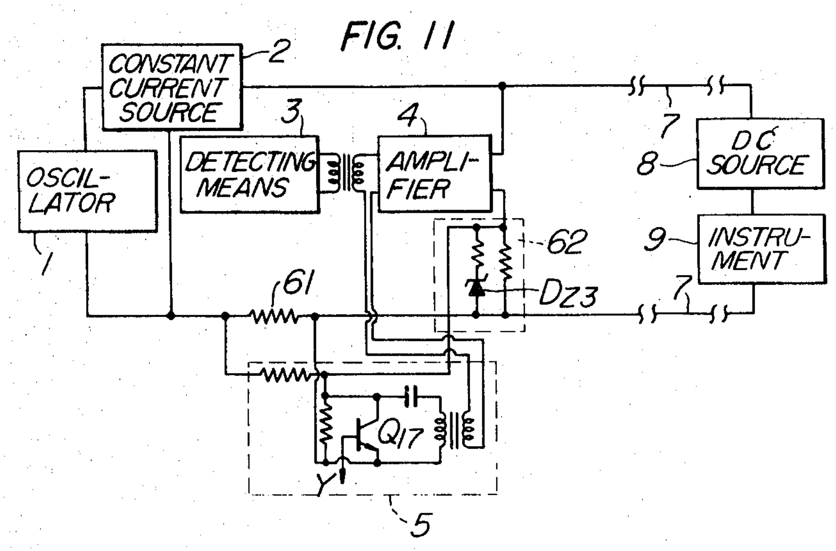

Practical circuit diagrams of the detecting means 3, amplifier 4 and feedback means 5 in FIG. 1 are illustrated in FIGS. 9 through 11.

Referring to FIG. 9, the detecting means 3 comprises a bridge circuit of resistors $R_{15}$ through $R_{18}$. Actually, the resistance of one of these resistors varies depending on a temperature or pressure or any other quantity to be measured and an unbalanced electric output representative of the quantity is delivered from the bridge. This output is applied to the amplifier 4 through a transformer $T_1$. The amplifier 4 comprises an A.C. amplifier section consisting of transistors $Q_{10}$, $Q_{11}$, $Q_{12}$ and $Q_{13}$, a synchronous rectifier section consisting of a transistor $Q_{14}$, a rectifying diode $D_3$ and a smoothing capacitor $C_3$, and a D.C. amplifier section consisting of transistors $Q_{15}$ and $Q_{16}$. A Zener diode $D_{22}$ is provided in order to clamp the operating point of a transistor $Q_{13}$ at a suitable value. The output from the transistor $Q_{16}$ is sent to the central control station through the transmission lines 7. The drop voltage across the feedback impedance element 6 interposed in one of the transmission lines is converted into an A.C. voltage by atransistor chopper $Q_{17}$ to be negatively feedback to the input side of the amplifier 4 through a transformer $T_2$. The negative feedback is used for the stabilization of the operation of the system as well as for an improvement in the linearity.

Figure 12:
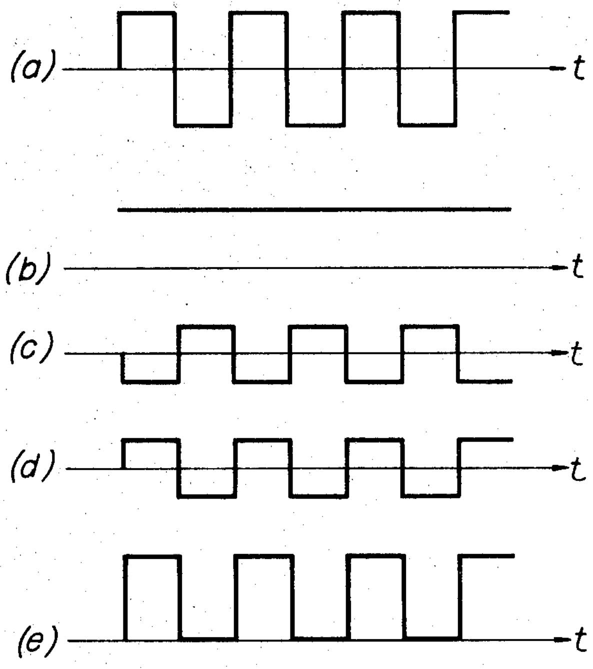
FIG. 12 is a diagrammatic illustration of the operation of the circuit shown in FIG. 9.

The operation of the circuit shown in FIG. 9 will now be described with reference to FIG. 12. The oscillator 1 described previously supplies a driving voltage for the bridge circuit. Since the oscillator 1 delivers a rectangular waveform output, the bridge circuit delivers also a rectangular waveform output as shown (a) in FIG. 12. Suppose that the drop voltage across the feedback impedance element 6 has a value as shown (b) in FIG. 12, then the output from the transistor chopper $Q_{17}$ will be as shown (c) in FIG. 12. It will be seen that the rectangular waveform output from the bridge is opposite in phase to the rectangular waveform output from the transistor chopper $Q_{17}$ since the driving voltage $x$ for the bridge circuit is opposite in phase to the driving voltage for the chopper $Q_{17}$. The input to the amplifier 4 has a waveform as shown (d) in FIG. 12 because it is the combination of the waveform shown as (a) in FIG. 12 and the waveform shown as (c) in FIG. 12. After A.C. amplification, the voltage having the waveform shown as (d) in FIG. 12 is applied to the transistor $Q_{14}$. The transistor $Q_{14}$ which is driven by the driving voltage $x$ is alternately turned on and off. The signal is not transmitted to the succeeding stage when the transistor $Q_{14}$ is turned on. Therefore, the output from the transistor $Q_{14}$ has a single polarity seen as (e) in FIG. 12. This signal is smoothed out by a capacitor $C_3$ and is then subjected to D.C. amplification by the transistors $Q_{15}$ and $Q_{16}$ to be sent to the measuring instrument 9. Although the driving voltage is shown as having equal periods of on and off, a waveform having different periods of on and off is employed in many cases for a reduction in power required.

A modification of the circuit of FIG. 9 is shown in shown in FIG. 10. In FIG. 10, the output from the transistor chopper $Q_{17}$ is applied, in superposed relation with the driving voltage $x$, to the bridge circuit in the detecting means 3 through variable resistors $R_{20}$ and $R_{21}$. In this arrangement, the relation among resistors $R_{20}$, $R_{22}$, $R_{23}$ and $R_6$ may be $R_{20}, R_6 \ll R_{22}, R_{23}$, so that the gain of the amplifier means 4 can be varied independently of the zero adjustment by merely varying the resistance of the resistor $R_{20}$. Furthermore, it is possible, by varying the resistance of the resistor $R_{21}$, to adjust the zero point independently of the gain of the amplifier means 4.

In FIGS. 9 and 10, the feedback element is of a linear type. It is frequently necessary to employ a nonlinear feedback element in order that the output from the amplifier is proportional to the quantity being measured. However, due to the fact that the voltage required for operating a non-linear element is generally larger than the voltage required for operating a linear element, the voltage of the D.C. source in the central control station must have a higher value when these elements are interposed in the same place of the circuit.

FIG. 11 shows a circuit which overcomes the above problem and is an improvement of the feedback circuit shown in FIGS. 9 and 10.

Referring to FIG. 11, a linear feedback element 61 and a non-linear feedback element 62 are separately disposed in different places of the circuit. While the non-linear feedback element 62 is shown in the form of a Zener diode $D_{23}$, any common diodes having non-linear characteristics may be utilized. In such an arrangement, the drop voltage across the element 61 and the drop voltage across the element 62 are applied in superposed relation to the transistor chopper $Q_{17}$ and an A.C. output delivered from the chopper $Q_{17}$ is fed back to the input side of the amplifier means 4. In this circuit, the oscillator 1 and the constant current circuit 2 requiring a large voltage are connected in series with the linear feedback element 61 requiring a small voltage, while the non-linear feedback element 62 requiring a large voltage is inserted in the output side of the rectifier means 4 requiring a small voltage. Thus, the required voltage across the pair of transmission lines is substantially equal to that required in the circuit shown in FIG. 10.

The system according to the present invention can be realized by a suitable combination of one of the constant current circuits shown in FIGS. 2 through 5, one of the oscillators shown in FIGS. 6 through 8 and one of the circuits shown in FIGS. 9 through 11. It will be understood that the system according to the present invention can be formed from any other suitable circuit means without departing from the spirit of the present invention.

What is claimed is:

1. A signal telemetering system comprising means disposed at a spot of measurement, means disposed in a central control station, and a pair of transmission lines for transmitting a signal detected at the spot of measurement to the central control station for the measurement of an input quantity to be measured, said first mentioned means disposed at the spot of measurement including detecting means for converting a measurable quantity into an electrical signal, an amplifier for amplifying the signal and for transmitting the output signal to the central control station through said transmission lines, feedback means for negatively feeding back a portion of the output signal of the amplifier to the input side of said amplifier, a constant current circuit, and a rectangular wave oscillator, said means disposed in the central control station including a D.C. power source and a measuring instrument, said constant current circuit being supplied with a D.C. voltage from said D.C. power source through said transmission lines to produce a constant current, said oscillator being operative to produce a rectangular waveform voltage by being driven by said constant current, said rectangular waveform voltage being supplied as a driving voltage to said detecting means, amplifier means and feedback means.

2. A signal telemetering system according to claim 1, in which said oscillator generates rectangular waveform voltages which are opposite in phase to each other, one of which is supplied to the detecting means and the amplifier, and the other of which is supplied to the feedback means.

3. A signal telemetering system according to claim 1, in which said oscillator comprises a first and a second transistor of the same type, a first positive feedback path including a first capacitor for connecting the collector of the second transistor to the base of said first transistor, a second positive feedback path including a third transistor and a second capacitor, said third transistor being in opposite type to that of said first and second transistors and connected in emitter follower configuration, the base of the third transistor being connected with the collector of the first transistor, and said second capacitor being inserted between the emitter of the third transistor and the base of the second transistor.

4. A signal telemetering system according to claim 1, in which said oscillator comprises a first and a second transistor of the same type, a first positive feedback path including a first capacitor for connecting the collector of said second transistor with the base of said first transistor, a second positive feedback path including a diode, a resistor and a second capacitor said diode and resistor being connected in series with each other and connected in the collector circuit of the first transistor, and said second capacitor being inserted between the base of said second transistor and the junction between said diode and resistor.

5. A signal telemetering system according to claim 1, in which said feedback means includes a feedback impedance element inserted in series in one of said pair transmission lines, a synchronous chopper supplied with the voltage produced across said feedback impedance element for operatively chopping said voltage in response to the rectangular wave produced by the oscillator and a transformer supplied with the chopped voltage by said chopper for negatively feeding back to the chopped voltage to the input side of said amplifier.

6. A signal telemetering system according to claim 5, in which the phase of the rectangular voltage applied to the chopper is opposite to that of the rectangular voltage applied to the detecting means and the amplifier.

7. A signal telemetering system according to claim 1, in which said constant current circuit comprises a first and a second transistor connected in Darlington configuration therewith, bias means connected in parallel with the output of said amplifier and including a Zener diode for producing a constant voltage thereacross, said constant voltage being supplied to the base of said Darlington configured circuit to produce a constant current irrespective of variation in the output of the amplifier.

8. A signal telemetering system according to claim 7, in which said constant current circuit further comprises a variable resistor connected in parallel with said Zener diode to provide desirably variable Zener voltage to be supplied to the Darlington circuit.

References Cited

UNITED STATES PATENTS

| | | | |
|---|---|---|---|
| 3,051,933 | 8/1962 | Cressey et al. ______ | 340—210X |
| 3,131,560 | 5/1964 | Cushman et al. _____ | 340—186X |
| 3,254,333 | 5/1966 | Baumoel _________ | 340—186X |
| 3,327,289 | 6/1967 | Goldstine et al. ___ | 340—210X |

STANLEY M. URYNOWICZ, Jr., Primary Examiner

U.S. Cl. X.R.

340—210

UNITED STATES PATENT OFFICE

CERTIFICATE OF CORRECTION

Patent No. 3,560,948 Dated February 2, 1971

Inventor(s) Fumiyuki Inose, et al

It is certified that error appears in the above-identified patent and that said Letters Patent are hereby corrected as shown below:

Column 1, priority data, which reads "43/83224" should read --42/83224--.

Signed and sealed this 29th day of May 1973.

(SEAL)
Attest:

EDWARD M.FLETCHER,JR.
Attesting Officer

ROBERT GOTTSCHALK
Commissioner of Pate

FORM PO-1050 (10-69)

USCOMM-DC 6